June 10, 1947.  M. G. CROSBY  2,422,082
REACTANCE CONTROL CIRCUIT
Filed March 3, 1943
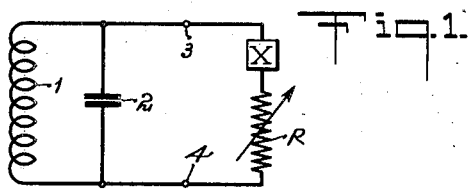
Fig. 1.
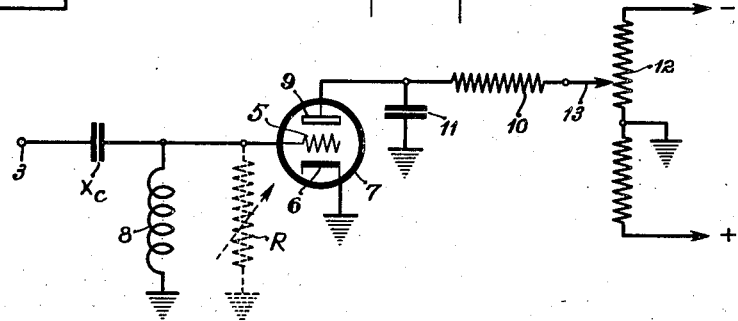
Fig. 2.
Fig. 4.
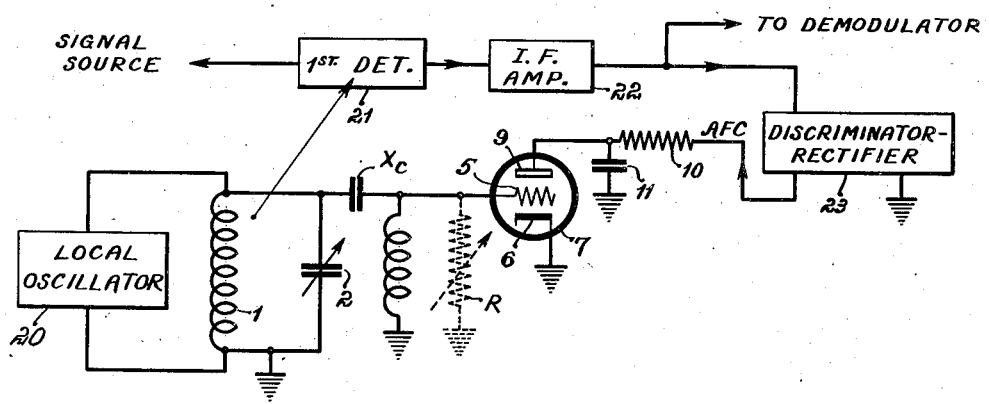
Fig. 3.
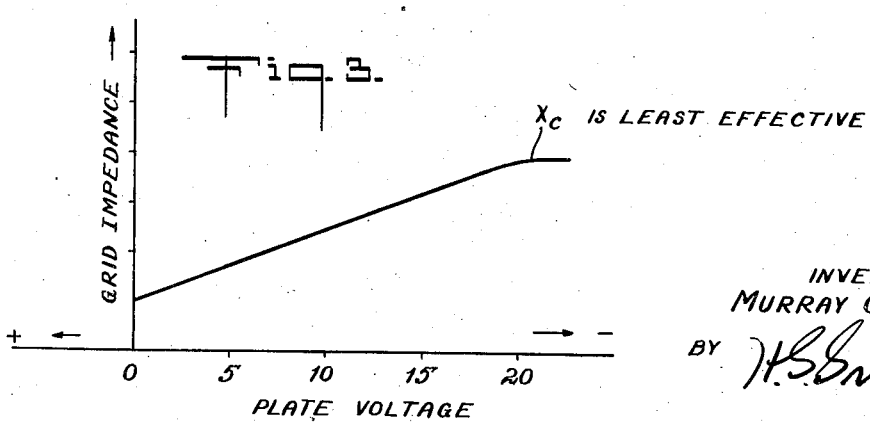
$X_C$ IS LEAST EFFECTIVE
INVENTOR
MURRAY G. CROSBY
BY
ATTORNEY Patented June 10, 1947

2,422,082

UNITED STATES PATENT OFFICE 2,422,082

REACTANCE CONTROL CIRCUIT

Murray G. Crosby, Riverhead, N. Y., assignor to Radio Corporation of America, a corporation of Delaware Application March 3, 1943, Serial No. 477,795

8 Claims. (Cl. 250—40)

My present invention relates to reactance control circuits, and more particularly to a method of, and means for, varying the effective magnitude of a reactance adapted to be included in an alternating current network.

It may be stated that it is one of the main objects of my present invention to provide a method of controlling the effective magnitude of a reactance by arranging the reactance in series with the control grid-to-cathode space of an electron discharge tube, and varying the anode potential of the tube over a relatively wide range of voltage values thereby to adjust the effective impedance of the aforementioned control grid-to-cathode space.

Another object of my invention is to provide a simple and effective reactance control circuit for regulating the frequency characteristic of high frequency current networks, there being employed as the reactance control circuit the series arrangement of a reactance and the internal control grid-to-cathode impedance of a tube whose anode potential is varied over a range of potentials to provide adjustment of the magnitude of the aforementioned internal impedance.

Still other objects of my invention are to improve generally the simplicity and efficiency of reactance control circuits, and more especially to provide such circuits in an economical manner.

Still other features will best be understood by reference to the following description, taken in connection with the drawing, in which I have indicated diagrammatically several circuit organizations whereby my invention may be carried into effect.

In the drawing:

Fig. 1 shows a generalized type of circuit to which the present invention is applicable, Fig. 2 illustrates an embodiment of the reactance control circuit, Fig. 3 graphically illustrates the functioning of the circuit of Fig. 2, Fig. 4 schematically shows a superheterodyne receiver to which the present invention is applied as an automatic frequency control (AFC).

Referring now to the accompanying drawing, wherein like reference characters in the different figures designate similar circuit elements, in Fig. 1 I have shown the general type of network to which the present invention is applicable. In an oscillatory circuit comprising an inductance coil 1 and a shunt tuning condenser 2, let it be assumed that the circuit has a predetermined resonant frequency. Assume, further, that the circuit 1—2 is the tank circuit of the master oscillator of a frequency modulated (FM) transmitter. To vary the frequency of circuit 1—2 there is shunted thereacross a network comprising generally a reactance X in series with a resistor R of adjustable magnitude. The terminals 3 and 4 are the opposite terminals of the network X—R. The reactance X may be capacitative or inductive. Varying the magnitude of R will cause the reactance to vary the frequency. A large magnitude of R will cause the effective magnitude of X to be small, whereas a small magnitude of R will permit a large magnitude of X to be shunted across the oscillatory circuit.

The resistive impedance R may be provided by an actual physical resistor, or it may be provided by the plate resistance of an electron discharge tube. The latter has been employed in the past, but has various disadvantages. According to my present invention, the series resistive impedance R is provided by an electron discharge device, but it is the internal control grid-to-cathode impedance of the device which is utilized.

Referring to Fig. 2, it will be seen that the reactance X is capacitative, and is designated by reference character $X_c$. The adjustable resistive impedance R is indicated in dotted lines, since it is the internal resistive impedance between the control grid 5 and cathode 6 of the electron discharge tube 7. The tube 7 is shown as a triode by way of example; any desired type of tube can be used. The cathode 6 is connected directly to ground, or, in general, to any point of relatively fixed alternating potential. The control grid 5 is returned to ground through the inductance coil 8. The plate, or anode, 9 of tube 7 is connected through a resistor 10, which may have a magnitude of about 0.5 megohm, to a direct current voltage supply source. The anode 9 is connected by condenser 11 to a point of relatively fixed alternating potential, such as ground. The condenser 11 may have a value of about 180 micro-micro-farads.

The direct current potential supply source essentially provides a wide range of potentials, say between zero and minus 22.5 volts or between zero and some desired positive voltage. The direct current source for providing the control potentials may be shunted by a potentiometer 12 provided with a slidable tap 13 which is connected in series to resistor 10. Of course, when the slider 13 is at the zero, or ground, point of potentiometer 12, the electron flow from cathode 6 to plate 9 will be greater than is the case when the slider 13 is at the most negative point of potentiometer 12. In the latter case most of the electrons would accumulate in the space adjacent to cathode 6. Accordingly, there would be no significant flow of electrons through the control grid. In that case, the control grid-to-cathode impedance of tube 7 would be a maximum. That is equivalent to stating that the dotted resistor R has maximum value.

On the other hand, when the slider 13 is adjusted to the zero voltage point of potentiometer 12, the concentration of electrons in the space adjacent cathode 6 would be greatly reduced with the result that the internal grid-to-cathode impedance would be low. That is, electrons would be drawn toward grid 5, and grid current flow would be had. In this case, the effective series resistance in circuit with $X_c$ would have less value. It will, therefore, be seen that by varying the potential of plate 9 over a relatively wide range of negative voltage values there is provided a relatively simple method of varying the effective magnitude of $X_c$. One of the important advantages of this scheme is that electron flow may be provided in the control grid circuit of tube 7 without space current flow through the plate circuit of the tube. Furthermore, the control is sensitive, and, therefore, is of value in the production of frequency modulated oscillations. It has been experimentally determined that for increasing magnitudes of $X_c$, the frequency deviation range will be greater. However, the constants of the circuit will depend upon the use to which it is to be put.

In Fig. 3 there is presented graphically the relation between adjustment of the plate voltage of the electron discharge tube 7 and the grid impedance thereof. It will be seen that when the plate voltage has maximum negative value the grid impedance will be maximum, and, therefore, the series capacitative reactance $X_c$ will be ineffective. On the other hand, $X_c$ has greatly increased effectiveness when the plate voltage is zero value. It is to be understood that the graphical presentation of Fig. 3 is purely qualitative, and in no way restricts the scope of the invention. By increasing the voltage of the anode in a positive direction, and above zero, the value of R can be further decreased.

In Fig. 4 I have shown in schematic form an AFC system to which the invention may be applied. Those skilled in the art are so fully acquainted with the networks of a superheterodyne receiver that the latter is schematically represented. There is schematically shown a local oscillator 20 whose tunable tank circuit consists of the coil 1 and condenser 2. The local oscillations are fed to a first detector 21, to which is also fed the received signal energy. The usual I. F. (intermediate frequency) amplifier 22 is fed from the first detector output. The I. F. output energy is supplied to a discriminator-rectifier network 23, and the latter produces AFC voltage which varies positive or negative relative to ground.

The AFC voltage is utilized to vary the potential of plate 9, in the manner described in connection with Fig. 2. The output energy of amplifier 22 may also be used to feed a demodulator or a second detector. It is not believed necessary to describe the specific functioning of this application of the invention. It is only necessary to point out that the AFC circuit varies the potential of plate 9 in such a manner that the inherent series resistance R has its magnitude varied so as to control the effect of $X_c$ on the tank circuit 1—2. The frequency of the tank circuit is adjusted so that the oscillations applied to first detector 21 will be of a frequency to compensate for any shift in I. F. energy from a predetermined frequency value.

Where the tube 7 is used to provide frequency modulation of carrier oscillations, the modulating signal voltage applied to plate 9 would be of audio frequency. The voltage, in that case, would vary over a wide range of negative and positive values relative to zero value. Hence, the invention is not restricted to use of purely direct current voltage at the plate 9.

While I have indicated and described several systems for carrying my invention into effect, it will be apparent to one skilled in the art that my invention is by no means limited to the particular organizations shown and described, but that many modifications may be made without departing from the scope of my invention.

What I claim is:

1. As a variable resistor element, an electronic device having at least a cathode, control grid and an anode, means establishing the anode and cathode at ground potential for high frequency currents, means establishing the grid and cathode at a common point of direct current potential, terminals for utilizing the internal grid-to-cathode impedance as solely a resistor element, a source of anode voltage and means connecting said source to said anode for adjusting the anode potential over a wide range of voltages thereby to vary said internal impedance in value.

2. In a device for varying the effective capacitative magnitude of a condenser, a tube provided with at least an electron emission electrode, a control grid and an anode, a source of direct current for the anode, means connecting the internal impedance between the grid and emission electrode as a resistor element in series between said condenser and ground, said grid and emission electrode being at a substantially like direct current potential, and means for adjusting the anode over a wide range of direct current potentials which are negative relative to ground.

3. In combination with a pair of terminals between which exists a high frequency potential, a series path between the terminals comprising a reactance and a resistive impedance of adjustable magnitude for controlling the effective magnitude of said reactance, an electron discharge device provided with at least a control grid, cathode and auxiliary cold electrode, said resistive impedance consisting of the internal control grid to cathode impedance of said electron discharge device, said control grid being closer to the cathode than said cold electrode, said grid and cathode being at a substantially common direct current voltage, a source of current for said auxiliary cold electrode, and means connecting said cold electrode to said current source for varying the potential of said cold electrode over a wide range of voltage values thereby to provide adjustment of said resistive impedance over a relatively wide range for the control of said reactance.

4. In combination with a pair of terminals between which exists a high frequency potential, a series path between the terminals consisting of a condenser and a control element therefore which consists of a resistive impedance of adjustable magnitude, an electron discharge device provided with at least a cathode, control grid and plate, said resistive impedance consisting of the internal grid to cathode impedance of said electron discharge device, said control grid being closer to the cathode than said plate, a source of voltage for said plate, and means adjustably connecting said plate to said voltage source for varying the potential of said plate over a wide range of voltage value thereby to provide a wide adjustment of said resistive impedance and a wide control of the value of said condenser.

5. In combination with a capacitative reactance, a resistive impedance connected in series relation with the reactance for controlling the effective magnitude thereof, a triode provided with a cathode, control grid and plate, a source of plate voltage, said resistive impedance consisting of the internal control grid to cathode impedance of said triode, said control grid being at a direct current potential substantially that of the cathode potential, and means connecting the triode plate to said source of potential for adjusting the plate potential over a wide range of values thereby to vary the magnitude of said resistive impedance widely.

6. In combination with a capacitative reactance, a resistive impedance in series relation with the reactance for controlling the effective capacity magnitude thereof, a triode provided with a cathode, control grid and plate, said resistive impedance consisting of the internal control grid to cathode impedance of said triode, a source of direct current voltage for said triode, said control grid and cathode being at a common direct current potential, and means adjustably connecting said triode plate to said source of direct current potential for adjusting the plate potential over a range of negative voltage values thereby widely to vary the value of the effective series resistive impedance.

7. A circuit for frequency modulating the oscillations of a resonant oscillation circuit, comprising a reactance, an electron tube provided with at least a cathode, control grid and anode, means for connecting in series across said oscillation circuit said reactance and the internal grid to cathode impedance of said tube, a source of modulating signal voltage, and means connecting said source to said tube anode for varying the anode potential over a range of negative and positive potentials thereby to adjust said internal impedance and consequently the effective magnitude of said reactance across said oscillation circuit.

8. Means for varying the effective magnitude of reactance in an alternating current network, said means comprising a reactance and an electron discharge device having a cathode, grid and an anode, means whereby said cathode and said grid are maintained at the same direct current potential, and means for adjusting the anode potential, the grid to cathode path of said device being in series with said reactance.

MURRAY G. CROSBY.

REFERENCES CITED

The following references are of record in the file of this patent:

UNITED STATES PATENTS

| Number | Name | Date |
|---|---|---|
| 2,231,367 | Mountjoy | Feb. 11, 1941 |
| 2,189,282 | Foster | Feb. 6, 1940 |
| 2,012,710 | Crosby | Aug. 27, 1935 |
| 2,294,100 | Travis | Aug. 25, 1942 |
| 2,153,779 | Travis | Apr. 11, 1939 |
| 2,058,411 | Carlson | Oct. 27, 1936 |
| 2,288,375 | Townsend | June 30, 1942 |
| 2,341,040 | Hathaway | Feb. 8, 1944 |
| 2,350,171 | Lawrence | May 30, 1944 |
| 2,361,634 | Koch | Oct. 31, 1944 |
| 2,361,731 | Bach | Oct. 31, 1944 |

FOREIGN PATENTS

| Number | Country | Date |
|---|---|---|
| 453,858 | Great Britain | Mar. 19, 1936 |
| 449,391 | Great Britain | June 15, 1936 |
| 492,408 | Great Britain | Sept. 20, 1938 |
| 495,339 | Great Britain | Nov. 11, 1938 |

OTHER REFERENCES

The Use of Vacuum Tubes as Variable Impedance Elements, by Herbert J. Reich. Reprinted from Proceedings of the I. R. E., vol. 30, No. 6, June 1942, 250–40.6A. (Copy available for reference in Division 51.)

The Wireless Engineer, July, 1936, by Frank L. Hill, pages 370–373. (Copy available for reference in Division 51.)

Radio Engineering, by Terman, published by McGraw-Hill Book Company, Inc., New York, New York, 1937, p. 149. (Copy available for reference in Division 51.)